E. H. ELTON & R. STEPHENS.
GAS LIGHTING AND EXTINGUISHING APPARATUS.
APPLICATION FILED FEB. 6, 1909.

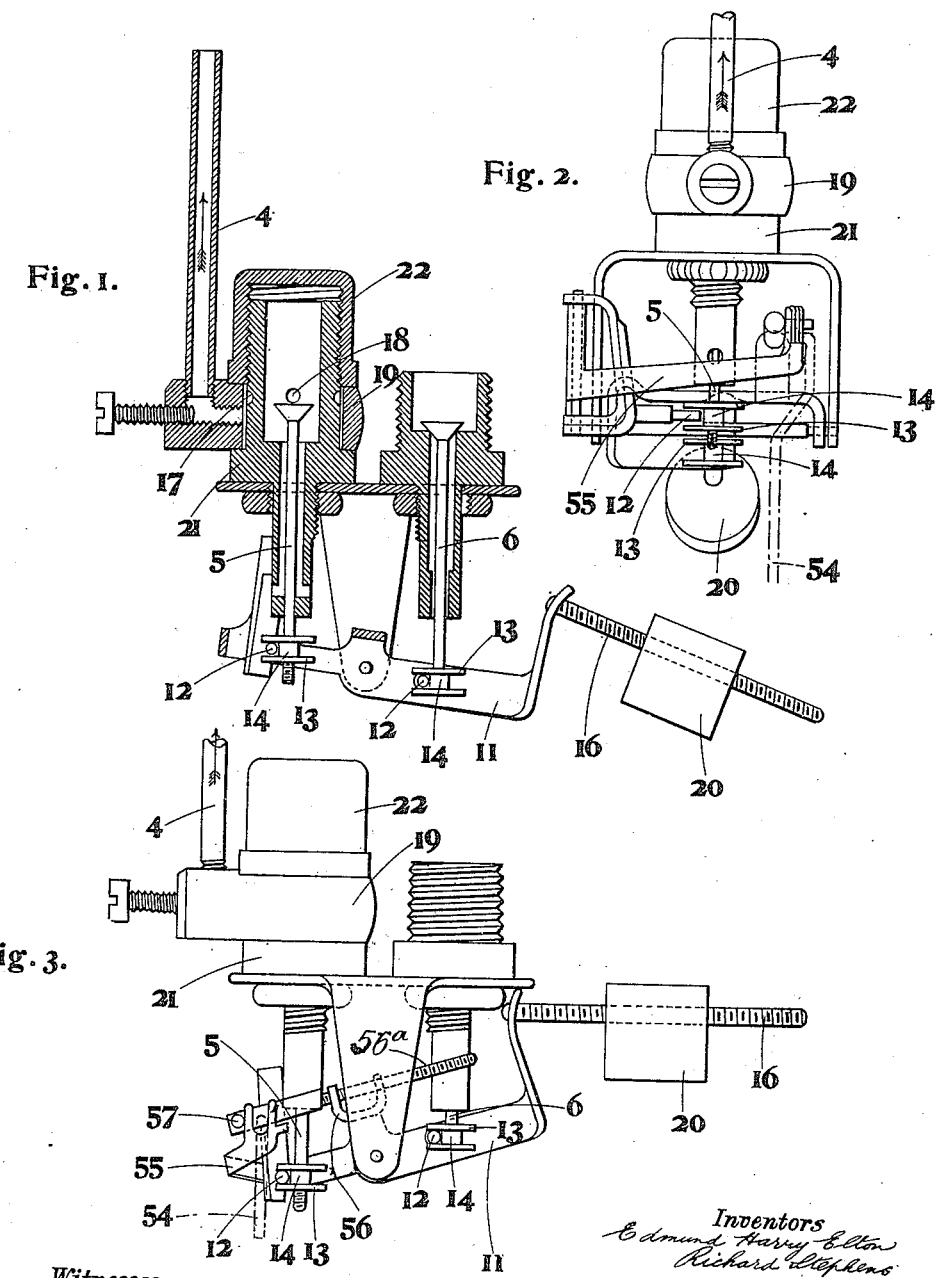

994,140.

Patented June 6, 1911.

4 SHEETS—SHEET 2.

Witnesses—

Inventors
Edmund Harry Elton
Richard Stephens
by
Attorney.

E. H. ELTON & R. STEPHENS.
GAS LIGHTING AND EXTINGUISHING APPARATUS.
APPLICATION FILED FEB. 6, 1909.
994,140.
Patented June 6, 1911.
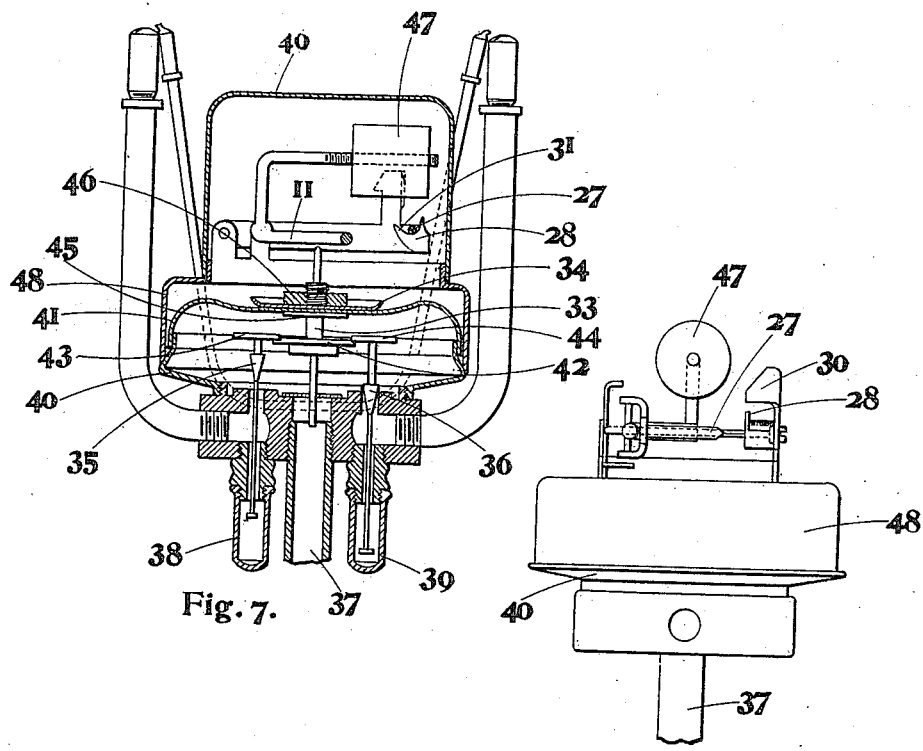
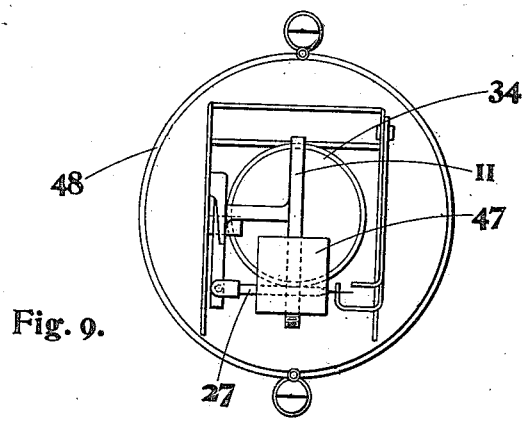
Witnesses—
Inventors
Edmund Harry Elton
Richard Stephens
by
Attorney.

E. H. ELTON & R. STEPHENS.
GAS LIGHTING AND EXTINGUISHING APPARATUS.
APPLICATION FILED FEB. 6, 1909.
994,140.
Patented June 6, 1911.
4 SHEETS—SHEET 4.
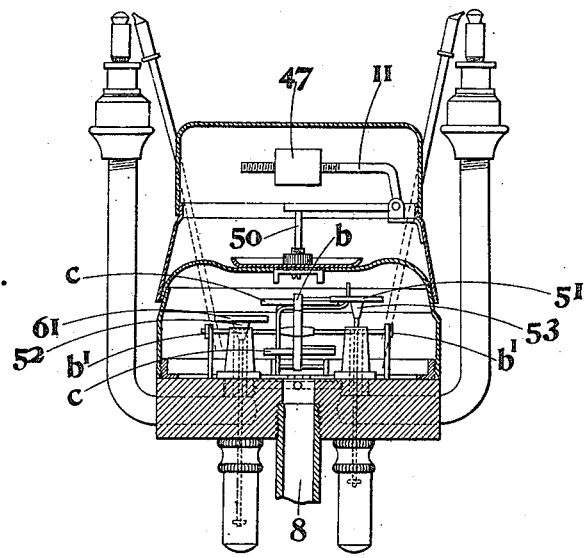
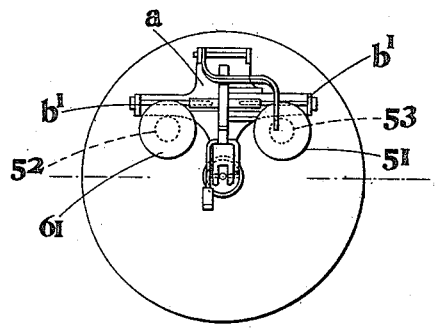
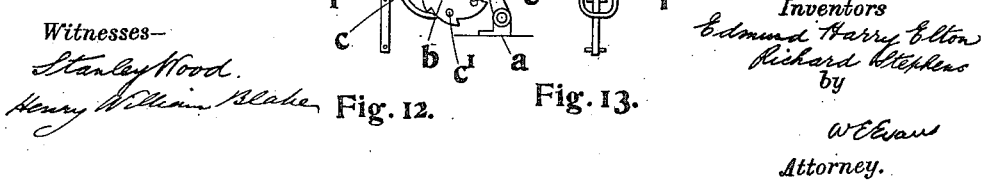
Witnesses—
Inventors
Edmund Harry Elton
Richard Stephens
by
W. E. Evans
Attorney.

UNITED STATES PATENT OFFICE.

EDMUND H. ELTON AND RICHARD STEPHENS, OF CLEVEDON, ENGLAND.

GAS LIGHTING AND EXTINGUISHING APPARATUS.

994,140.  Specification of Letters Patent. Patented June 6, 1911.

Application filed February 6, 1909. Serial No. 476,411.

*To all whom it may concern:*

Be it known that we, EDMUND HARRY ELTON, baronet, a subject of the King of Great Britain and Ireland, residing at Clevedon Court, Clevedon, in the county of Somerset, England, and RICHARD STEPHENS, a subject of the King of Great Britain and Ireland, residing at 9 The Triangle, Clevedon, in the county of Somerset, England, have invented certain new and useful Improvements Relating to Gas Lighting and Extinguishing Apparatus, of which the following is a specification.

This invention relates to gas lighting and extinguishing apparatus for operation from a distance by variation of pressure in the gas mains and has for its object to provide simple apparatus in which the valves for pilot lights and main burners respectively are controlled by mechanism fitted to the lamp and operated by the variation of the gas pressure acting upon a bellows or flexible diaphragm provided within a suitable casing.

The invention is shown in the accompanying drawings in which—

Figure 4:
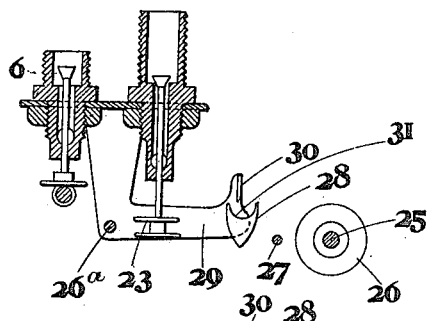
Figure 5:
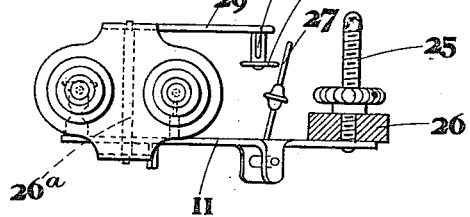
Figure 6:
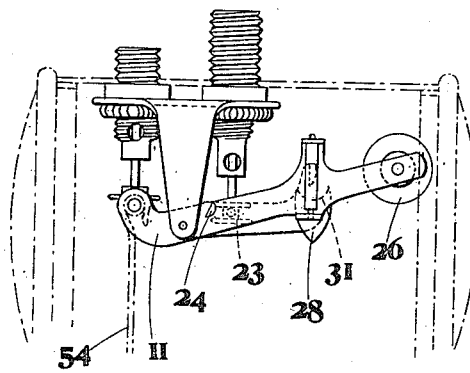

Figure 1 represents, in sectional elevation on an enlarged scale, the mechanism for operating the valves according to one construction. Fig. 2 is an end elevation corresponding to Fig. 1. Fig. 3 is a corresponding front view. Fig. 4 represents a constructional modification illustrated in sectional elevation. Fig. 5 is a plan view corresponding to Fig. 4. Fig. 6 is a front elevation corresponding to Figs. 4 and 5. Fig. 7 is a cross sectional elevation of a modified apparatus for controlling two burners in which the valve containing mechanism is inclosed within the diaphragm. Fig. 8 is an elevation corresponding thereto. Fig. 9 is a plan view corresponding thereto. Fig. 10 is a cross-sectional elevation of a modified form of apparatus for controlling two burners. Fig. 11 is a plan of the valves and ratchet wheel mechanism corresponding thereto. Fig. 12 is an end elevation of the diaphragm spindle and ratchet wheel mechanism for operating the valves of the modified form of apparatus. Fig. 13 is an elevation corresponding to Fig. 12.

This invention relates to simple means for operating the valves of the pilot burner and main burner and consists in operating the valves directly from a lever 11 (Figs. 1 to 6) by projections or pins 12 provided or mounted upon the said lever, which work in grooves in the valve spindles or against the sleeves or flanges 13 provided thereon or by the provision of slots in the said lever with which engage the grooved ends of the valve spindle or the like.

As illustrated in Figs. 1–3 the lever 11 is provided with pins 12 which engage between flanges 13 provided on collars 14 that are mounted on the respective valve spindles 5, and 6, 5 being the spindle of the main valve and 6 the spindle of the pilot valve. The collars 14 carrying the flanges 13 may be screw threaded upon the valve spindle to provide for the necessary adjustment.

The invention also relates to means for regulating the lighting and extinguishing of the burners under varying conditions and according to this part of the invention the threaded portion of the lever 11 or threaded stem 16, secured to the lever, may be disposed at such an angle as will enable the weight 20 to be moved from one end to the other of the stem 16 without altering the difference between the lighting and extinguishing pressures and the weight 20 may be adjusted on the stem 16 by rotation. The angle, which is found by experiment, must be such that in neither of the extreme positions of the movement of the lever 11 is the threaded stem disposed vertically. The lighting and extinguishing pressures may also be independently adjusted by attaching the diaphragm wire 54 to an arm 55 hinged at its lower or its upper extremity to the lever 11 or hinged to the lever 11 to swing like a gate. Thus, when the pressure upon the diaphragm increases, the arm 55 is drawn away from the stop 56 toward the second stop 57, provided on the screwed rod 56$^a$, this position of the arm corresponding to the extinguishing pressure. Upon adjustment of the distance between the stops, by screwing the rod 56$^a$ into or out of the stop 56 the lighting and extinguishing pressures are altered.

The invention also relates to an improved means for attaching the by-pass connection to the burner and consists in providing the tube or by-pass valve seating with a swivel connection to allow the by-pass tube to be fitted to burners of various widths without bending and to allow the valve to be removed from its seating without disconnecting the by-pass tube.

For the purpose the valve casing 21 is provided with an annular groove 17 on the outside communicating with the interior by radial holes such as 18. Surrounding the casing is a loosely fitting collar 19 through which the by-pass tube 4 is led. Ground faces are provided on the collar 19 the valve casing 21 and the locking cap 22 thus securing gas tight joints. In setting up, the collar 19 is rotated until the by-pass tube is in the required position and is then locked by screwing down the cap 22.

In the modification illustrated in Figs. 4–6, the connection of the valve spindle to the lever 11 is substantially the same as in Figs. 1–3, namely the flanges 23 engage with the projection 24, but in the case of the pilot valve 6 only one flange is mounted upon the valve stem and contact is made with a pin mounted upon the extremity of the lever 11. The weight 26 may, however, as illustrated in Figs. 4–6 be carried by means of a stem 25 carried by the lever 11 and disposed parallel with the pivoting pin 26$^a$ of the lever 29 so that thus provision is made for a number of weights to be added for the purpose of altering the lighting pressure without altering the difference between the lighting and extinguishing pressures.

According to the invention we also provide means for retaining alight certain burners, notwithstanding the lowering of gas pressure, and extinguishing the same by the lowering of the pressure after one or more previous increases of pressure and for the purpose a rod 27 (Figs. 4–6) is fulcrumed or hinged to the lever 11 to swing like a gate (Figs. 4–6) and a stop 28 is carried on a fixed arm 29 and a part 30 is disposed behind the stop 28 and so fixed to the arm 29 that on rising from the lower position indicated in Fig. 6, of the lever 11, the part 27 will assume a position immediately above the notch 31 in the part 28 and against the stop 30, so that on the fall of the lever 11 on the decrease of pressure, the part 27 will engage in the notch 31 in the part 28 and the further fall of the lever 11 will be prevented, while on the increase of pressure and the consequent upward movement of the lever 11, the part 27 will pass from the notch 31 in the part 28 to the left of the stop 30, and owing to the inclination of the pivot of the part 27, its stem will fall away from the notch and on the fall of the lever 11 will pass to the left of the part 28 until the lever 11 assumes its lower position when the inclination of the pivot of the part 27 will cause it to assume the position indicated in Figs. 4 and 5.

It will be understood that Fig. 6 indicates the position of the lever 11 in which its fall is arrested on the decrease of pressure.

The invention moreover relates to the diaphragm fittings for adjusting the lighting and extinguishing pressures and consists in making the diaphragm and fittings of suitable shape to take weights for adjusting the lighting and extinguishing pressures. For example, in order that the weights for adjusting the lighting pressure may be in the form of shot the diaphragm rod 33 may be extended beyond the diaphragm and provided with a screwed extremity and nut, the extension carrying upon a loosely mounted plate a stamped metal casing 34 for the reception of shot.

In carrying the invention into effect according to one of the modifications in which the valve mechanism is inclosed within the diaphragm (Figs. 7, 8 and 9) in its application to apparatus for the control of two burners, a fitting is provided carrying two adjacent valves 35, 36 these valves being each disposed within a vertical passage in the fittings, the upper part of which serves as an outlet for gas from the gas chamber, supplied through the inlet 37, and, at the same time, as a seat for the valve, while the spindle extends downwardly and advantageously protrudes so that the respective valves may be adjusted without the necessity of opening the gas chamber. Screwed caps 38, 39 are suitably provided so as respectively to cover the lower protruding extremities of the valve spindles.

The fitting referred to is advantageously provided with a circular upstanding flange upon which is received the screwed boss of a circular base plate 40 serving as the base of the gas chamber. This circular base plate is provided with an upstanding peripheral flange upon the upper extremity of which the edge of the diaphragm 41 is carried, the diaphragm being provided of leather, rubber, canvas or any other suitable material or as a substitute for a diaphragm, a bell arrangement working in liquid may be used.

Centrally of the fitting is carried the diaphragm spindle 33 which is disposed intermediate of the respective valves and advantageously carries a flange 42 disposed beneath the respective valve heads 43, 44 and adapted to contact with the under-side of the valve heads which for the purpose may be suitably extended. A separate flange 45 is provided near the upper extremity of the diaphragm spindle to support the diaphragm 41 at the center and the diaphragm is clamped between this supporting flange and a surmounting plate 34 and a nut 46 is advantageously provided by means of which a tight joint is insured.

The upward extremity of the diaphragm spindle may be provided with a knife edge or fine point to take a bearing within the recess provided for the purpose in the control lever 11 or it may instead be jointed or otherwise connected to the control lever which is so disposed with reference to the spindle as to permit of the upward movement of the spindle to an extent determined by an adjustable weight 47 which may be provided thereon.

A casing 48 is provided to be applied upon the upstanding peripheral flange of the base plate of the gas chamber, and on said casing 48 is a detachable cap 49 so as completely to inclose the controlling lever and mechanism.

It will be understood that the weighted lever arm 11 is pivoted to the casing 48 and provided with a rod 27 swinging laterally and arranged to engage with a stop piece 30 and a cam piece 28, having a notch fixed upon the casing.

Upon a first increase of gas pressure the lever 11 is lifted by the diaphragm 41 the rod 27 swinging against the stop 30 and both the valves are opened. When the pressure is decreased by a certain amount, the lever 11 falls and the rod 27 engages with the notch 31. This fall is sufficient to secure the closing of the valve 36 thus extinguishing one burner, the valve 35 remaining open. A further temporary increase and decrease of pressure will suffice to disengage the rod 27 from the notch 31 and allow it to return to a position below the cam 28, the lever 11 falling at the same time and permitting the valve 35 to close, thus extinguishing the second burner.

According to the second modification (Figs. 10, 11, 12) the controlling mechanism is contained within the gas chamber and is arranged to operate the valves only upon an increase or only upon a decrease of the gas pressure, the control lever having full travel for every movement of the valves. A ratchet wheel $b$ is carried in bearings $b^1$ and is provided with two sets of perpendicularly mounted pins or projections $c$, $c^1$ which engage with the valve flanges 51 and 61, the set $c$ projecting from one face only and the set $c^1$ projecting from both faces. The pins are arranged in pairs, a pin $c^1$ with a pin $c$, with a pitch equal to that of the teeth of the wheel $b$, every third tooth being without a pin, but it is to be understood that cams, pins or projections may be so arranged as to operate the valve or valves in any desired cycle. The diaphragm spindle plate 3 is provided with a weighted swinging arm $f$, which engages with the teeth of and operates the ratchet wheel. A detent $g$, mounted upon the plate $a$ or the fitting, is provided to prevent backward rotation of the wheel $b$.

A control lever 11, carrying the adjustable weight 47 for determining the operating pressure is provided to engage the point of the diaphragm spindle 50.

In operation the valves being closed, upon an increase of the gas pressure, the diaphragm spindle 50 is raised and by means of the weighted arm, $f$, the wheel $b$ is partly rotated, engaging a pin $c^1$ with the valve flanges 51, 61 thus opening both valves. The gas pressure may now, if desired be reduced without any resulting movement of the mechanism. Upon a second increase of pressure, the wheel $b$ is again partly rotated and the pin $c^1$ is disengaged and a pin $c$ brought into engagement with the valve flange 51. The valve 52 is thus permitted to close and one burner alone remains burning. Upon a third increase of pressure, the pin $c$ is disengaged and the valve 53 closes, both burners then being extinguished.

If the mechanism is operated by decreases of pressure it will be understood that the arm $f$ is arranged to rotate the wheel $b$ in the opposite direction, the pins $c$, $c^1$ being disposed accordingly.

The respective by-passes may be controlled in the same manner as that described for the first modification of the apparatus.

What we claim as our invention and desire to secure by Letters Patent is:—

1. Apparatus for lighting and extinguishing gas burners from a distance comprising main and pilot burner valves, a lever in connection with said valves, an adjustable weight on said lever, a diaphragm, and means permitting of retaining the main burner valve open on a slight decrease of gas pressure comprising a pivotally mounted lever on said lever means limiting the rocking movement of said second lever and means connecting the second lever to the diaphragm.

2. Apparatus for lighting and extinguishing burners from a distance comprising main and pilot burner valves, a lever connected to said valves, said lever being provided with a threaded end, a weight upon said threaded end, said weight being capable of adjustment on said threaded end of lever, a diaphragm, a diaphragm spindle, and means permitting of retaining the main burner valve open on a slight decrease of gas pressure comprising a lever pivotally mounted on said lever, means limiting the rocking movement of the second lever, and means connecting the second lever to the diaphragm spindle.

3. Apparatus for lighting and extinguishing gas burners from a distance comprising means for alternately operating the valves of the pilot and main burners, a diaphragm upon which the gas exerts a pressure, means for regulating the pressure at which the mechanism will operate, means permitting of retaining the main burner valve open on a slight decrease of gas pressure, comprising a lever connected to the valves, a second lever pivotally mounted on said lever, means limiting the rocking movement of the second lever and means connecting the second lever to the diaphragm.

4. Apparatus for lighting and extinguishing gas burners from a distance comprising main and pilot burner valves, a lever alternately operating said valves, means tending to keep the main burner valve closed, a diaphragm upon which the gas exerts a pressure, means for varying the pressure at which the valves are operated, means permitting of retaining the main burner valve open on a slight decrease of gas pressure comprising a pivotally mounted lever on said lever, means limiting the rocking movement of said second lever and means connecting the second lever to the diaphragm.

5. Apparatus for lighting and extinguishing gas burners from a distance comprising main and pilot burner valves, a lever connected to said valves, a diaphragm upon which the gas exerts a pressure, an adjustable weight provided on said lever, said weight being adapted to regulate the gas pressure at which the valves operate, and means permitting of retaining the main burner valve open on a slight decrease of gas pressure comprising a pivotally mounted lever on said lever, means limiting the rocking movement of said second lever and means connecting the second lever to the diaphragm.

In testimony whereof we have hereunto signed our names to this specification in the presence of two subscribing witnesses.

E. H. ELTON.
R. STEPHENS.

Witnesses:
E. J. FUSSELL,
G. T. PITCHER.

---

Copies of this patent may be obtained for five cents each, by addressing the "Commissioner of Patents, Washington, D. C."